United States Patent [19]

Martin, Jr. et al.

[11] 4,032,920

[45] June 28, 1977

[54] TWO-FREQUENCY INSTRUMENT LANDING SYSTEM WITH INTEGRAL MONITOR

[75] Inventors: Edwin J. Martin, Jr., Kansas City; Akemichi Yamada, Raytown, both of Mo.

[73] Assignee: Wilcox Electric, Inc., Kansas City, Mo.

[22] Filed: Sept. 2, 1975

[21] Appl. No.: 609,627

[52] U.S. Cl. .................................... 343/108 R
[51] Int. Cl.² ...................... G01S 1/16; G01S 1/18
[58] Field of Search ............... 343/107, 108 R, 109

[56] References Cited

UNITED STATES PATENTS

| | | | |
|---|---|---|---|
| 3,713,160 | 1/1973 | Becavin | 343/109 |
| 3,866,228 | 2/1975 | Alford | 343/108 R |

*Primary Examiner*—Maynard R. Wilbur
*Assistant Examiner*—T. M. Blum
*Attorney, Agent, or Firm*—D. A. N. Chase

[57] ABSTRACT

A two-frequency capture-effect instrument landing system employs a single localizer antenna array for both course-frequency and clearance-frequency radiation. The composite course and clearance signals are formed by networks that utilize trees of hybrid power dividers to effect unequal power division and distribute the signals to the antenna feeders. Integral monitoring is provided by similar networks, operating backwards in a functional sense, which recombine samples of the RF energy on the antenna elements and separate the same into the basic, frequency-separated course and clearance signal components. Redundant monitoring for antenna fault detection is provided by detecting RF signal levels on unused ports of the monitor circuit power dividers.

10 Claims, 14 Drawing Figures

TWO-FREQUENCY INSTRUMENT LANDING SYSTEM WITH INTEGRAL MONITOR

This invention relates to improvements in instrument landing systems and, more particularly, to an improved two-frequency capture-effect system employing a single antenna array and integral monitoring of the frequency-separated components of the radiated RF energy.

An instrument landing system (ILS) for aircraft provides guidance both in the azimuth plane for alignment with the runway and along the glide path of the approaching aircraft. Guidance in the azimuth plane is accomplished by the localizer portion of the system which defines a line of approach corresponding to the centerline of the runway. Space-modulated radio navigation signals are received and demodulated by the airborn receiver and, if the aircraft is on the line of approach, the difference in the depth of modulation (ddm) of detected 90 Hz and 150 Hz signals is zero. Likewise, in the glide slope portion of the system, the ddm is also zero if the aircraft is in the defined glide path.

Although the present invention is concerned primarily with guidance in the azimuth plane (the localizer), its teachings are equally applicable to the glide slope portion of an instrument landing system. In either case, it is desired that the system be made as insensitive as possible to the intrusion of unwanted reflected energy, course bends, and other phenomena which introduce inaccuracies into the navigational course defined by the transmitted radiation.

Heretofore, to minimize these course inaccuracies, instrument landing systems have been developed and utilized that employ the capture-effect principle in order to provide a narrowly defined course radiation pattern and a wider, clearance pattern which cannot interfere with the course. The capture-effect system relies on frequency separation between the course and clearance signals, often radiated by two separate antenna arrays. One array, referred to as the course array, has a relatively wide aperture and, consequently, produces a highly directional radiation pattern which concentrates the radiated RF energy into a rather narrow beam directed along the course centerline. This radiated signal, therefore, provides only "on-course" lateral guidance for an approaching aircraft. The other antenna array, referred to as the clearance array, has a much smaller aperture and is designed to produce a broad radiation pattern that provides lateral guidance in a region extending some considerable distance to either side of the course centerline. The course array and the clearance array radiate signals of slightly different carrier frequencies, typically a frequency separation of from 5 to 10 KHz. It may be appreciated that this frequency separation is relatively small, particularly in view of the fact that the localizer frequency band is from 108 to 112 MHz.

The capture-effect is a phenomenon resulting from the nature of the linear detectors utilized in airborne localizer receiving equipment. The receiver passband is sufficiently wide to accept both the course frequency and the clearance frequency signals. However, when two signals of slightly different frequency are simultaneously present in the passband of the receiver, the linear detector will discriminate against the weaker signal, in favor of the stronger one (the course signal), thereby causing the receiver to be "captured" by the stronger signal and to essentially ignore the weaker, clearance signal.

Although the two-frequency capture-effect system is a decided improvement from the standpoint of reduction of course interference as discussed above, inherent problems are also presented. First of all, the common use of two separate antenna arrays increases both production and installation costs, plus the ground area adjacent an airport that must be reserved for the dual array installation. Although the course and clearance signals can be combined in a single array, this has presented the problem of providing desired monitoring of system operation since the composite signals fed to the antenna must be recombined and then separated in order to obtain a true indication of system performance. Resistive combining networks have commonly been utilized for this purpose, but such networks cannot separate signals of different frequencies. In fact, the small frequency difference between the course and clearance signals even makes their separation by means of electronic filters a practical impossibility.

It is, therefore, an important object of the present invention to provide a two-frequency capture-effect instrument landing system requiring only a single antenna array, and which includes an integral monitor that is capable of separating the course and clearance signal components in order to provide a true and accurate indication of system performance.

Another important object of the present invention is to provide a two-frequency capture-effect instrument landing system which is designed to maximize flexibility in the shaping of the radiated patterns of course-frequency and clearance-frequency energy.

As a corollary to the preceding object, it is an important aim of this invention to provide such flexibility without combining signal components and then attenuating certain components in order to obtain a desired amplitude distribution for the elements of the antenna array, thereby maximizing efficiency and minimizing the need to dump power.

Yet another important object of the invention is to provide RF power distribution networks feeding the antenna array of an instrument landing system, which are duplicated in the combining circuitry of an integral monitor and operated backwards in a functional sense, such networks in the monitor by addition and subtraction processes providing separate monitoring of the course-frequency and clearance-frequency signal components notwithstanding the small frequency difference between such components.

Furthermore, it is an important object of this invention to provide an instrument landing system having an integral monitor as aforesaid with a redundant monitoring capability for antenna fault detection.

THE SINGLE ANTENNA ARRAY

Figure 1:
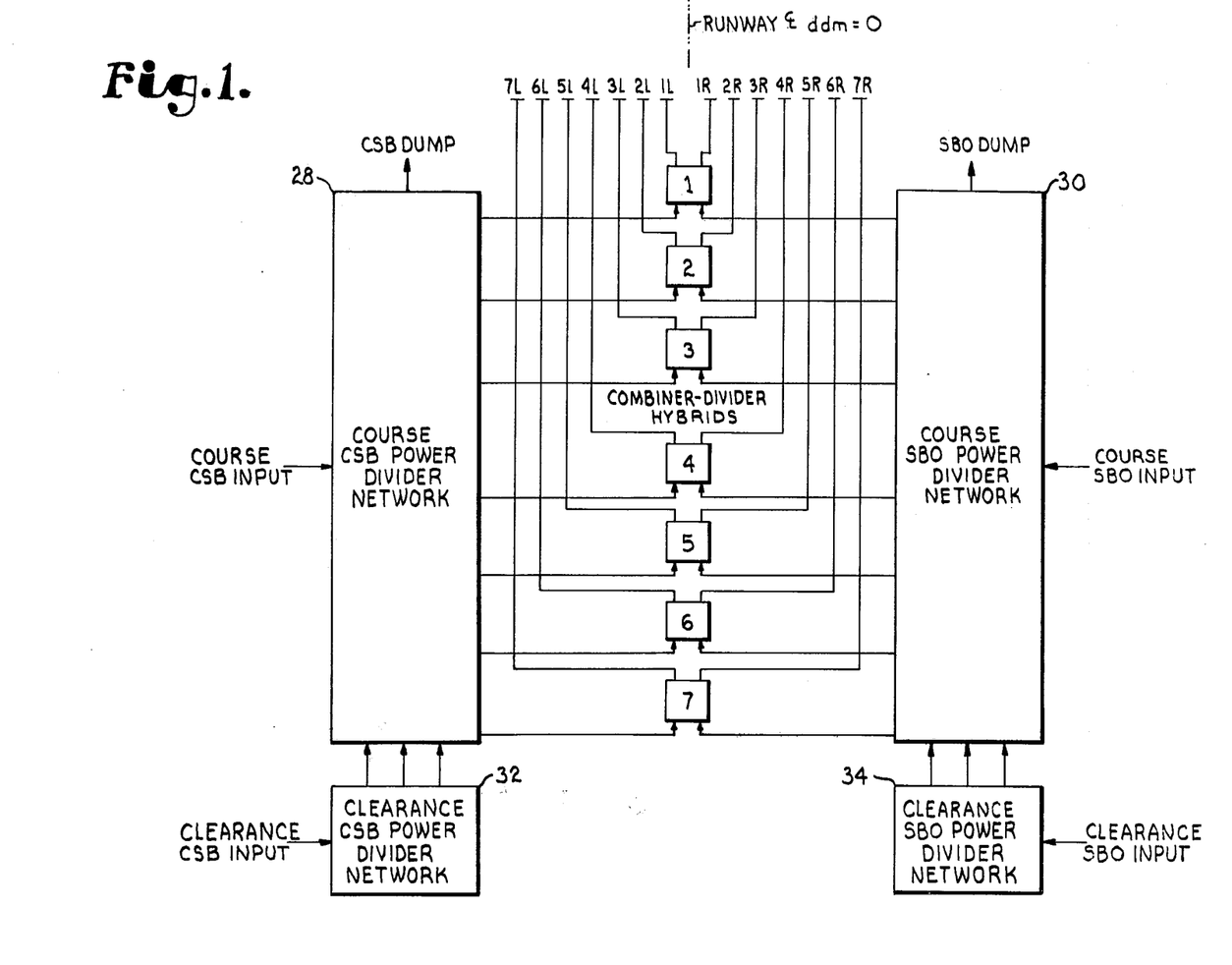
FIG. 1 is a block diagram of an RF distribution system embodying the teachings of the present invention, a localizer antenna array being illustrated schematically in association with the centerline of the runway which it serves.

Referring to FIG. 1, the two-frequency capture-effect localizer system of the present invention employs a single antenna array preferably containing fourteen elements as illustrated schematically and designated 1L through 7L and 1R through 7R. The numerical portion of these designations represents the location of the element relative to an extension of the runway centerline (1L being the element closest to the centerline on the left side, 2L being next, etc.). Left (L) and right (R) refer to directions to the side of the runway centerline as viewed from the back of the array looking in the forward radiation direction (toward an approaching aircraft flying the guidance path). Each of the fourteen elements is a horizontally polarized log-periodic dipole antenna, or may be a directional antenna of any other conventional design suitable for very high frequency transmitting applications. The log-periodic type antenna has an advantage due to its broad resonance and resulting insensitivity to heavy icing conditions and low standing wave ratio over the entire localizer band (108 to 112 MHz).

The fourteen radiating elements are spaced apart along a straight line, referred to as the array axis, which is orthogonal to an extension of the runway centerline. Each pair of elements 1L—1R, 2L—2R, 3L—3R, etc. is symmetrically disposed about the array center (which is intersected by the extended runway centerline) and spaced progressively greater distances from such center along the array axis from the innermost pair 1L—1R to the outermost pair 7L—7R. All fourteen elements (seven pairs) radiate course-frequency signals; the center six elements (the three pairs 1L—1R, 2L—2R and 3L—3R) also radiate clearance-frequency signals. The width of the array, as determined by the center-to-center distance between the elements of the outermost pair 7L—7R, is approximately 86 feet (26 meters). Normally, the elements of the array are supported approximately 6 feet (2 meters) above the ground. The array may be located from 300 to 2000 feet (90 to 600 meters) beyond the stop end of the runway which it serves.

Figure 13:
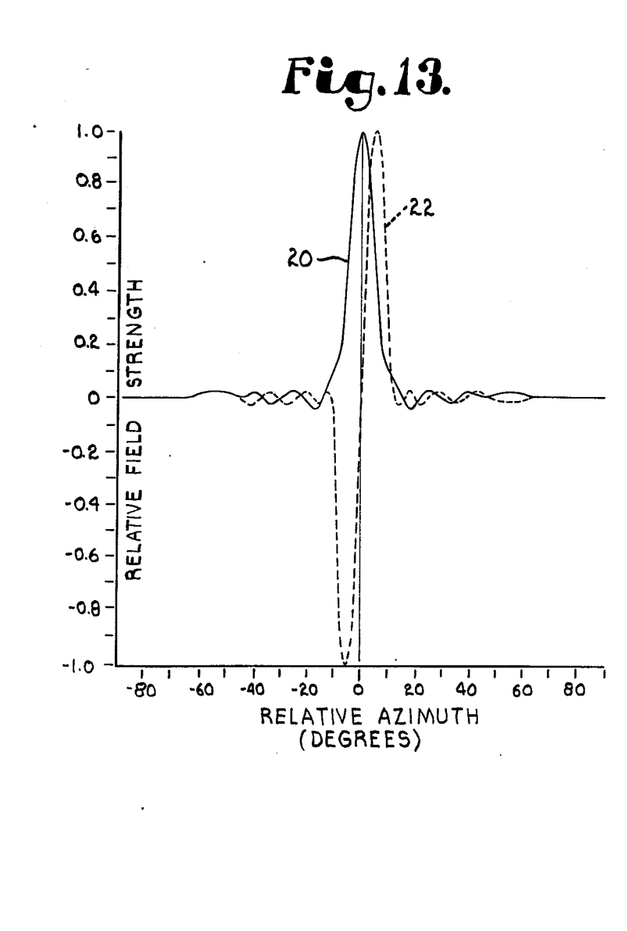
FIG. 13 is a graph of the radiation patterns of the course-frequency signals.

Table I shows the precise physical arrangement of the 14 log-periodic elements which constitute the course-frequency array, and the relative amplitudes and phases of the carrier plus sidebands (CSB) and sidebands only (SBO) signals that are radiated by each of these elements. (By way of explanation, the CSB signal comprises a radio frequency carrier amplitude modulated with 90-Hz and 150-Hz audio signals; the SBO signal is a double sideband, suppressed carrier signal that combines with the carrier in space to cause the 90-Hz modulation to predominate on one side of the course centerline, and the 150-Hz modulation to predominate on the opposite side.) The course-frequency CSB radiated pattern produced by this arrangement of fourteen elements is illustrated at 20 in the graph of FIG. 13. The abscissa is relative azimuth left (positive) and right (negative) of the extended runway centerline (0°). As may be seen in FIG. 13, the course-frequency array is highly directional. The half-power beamwidth of the CSB radiation pattern is less than ±3.75°. Moreover, the radiation level is down at least 26 db beyond ±12.0°. The course-frequency SBO radiation pattern is illustrated at 22 and rises from the null on the course centerline to a maximum at about ±4.5°. Subsequently it falls to (and remains below) a −26 db level around ±11.25°. Thus, the course-frequency array produces a highly directional beam concentrated along the course centerline.

Table 1.

| Ant No. | Dist. from Array Center (Inches) | Relative CSB Signal Ampl. | Phase | Relative SBO Signal Ampl. | Phase |
|---|---|---|---|---|---|
| 7L | 515-1/32 | 0.160 | 0° | 0.367 | −90° |
| 6L | 434-9/16 | 0.160 | 0° | 0.555 | −90° |
| 5L | 354-3/32 | 0.263 | 0° | 0.889 | −90° |
| 4L | 273-5/8 | 0.491 | 0° | 1.000 | −90° |
| 3L | 193-5/32 | 0.714 | 0° | 1.000 | −90° |
| 2L | 112-11/16 | 1.000 | 0° | 0.667 | −90° |
| 1L | 32-7/32 | 0.893 | 0° | 0.222 | −90° |
| 1R | 32-7/32 | 0.893 | 0° | 0.222 | +90° |
| 2R | 112-11/16 | 1.000 | 0° | 0.667 | +90° |
| 3R | 193-5/32 | 0.714 | 0° | 1.000 | +90° |
| 4R | 273-5/8 | 0.491 | 0° | 1.000 | +90° |
| 5R | 354-3/32 | 0.263 | 0° | 0.889 | +90° |
| 6R | 434-9/16 | 0.160 | 0° | 0.555 | +90° |
| 7R | 515-1/32 | 0.160 | 0° | 0.367 | +90° |

Figure 14:
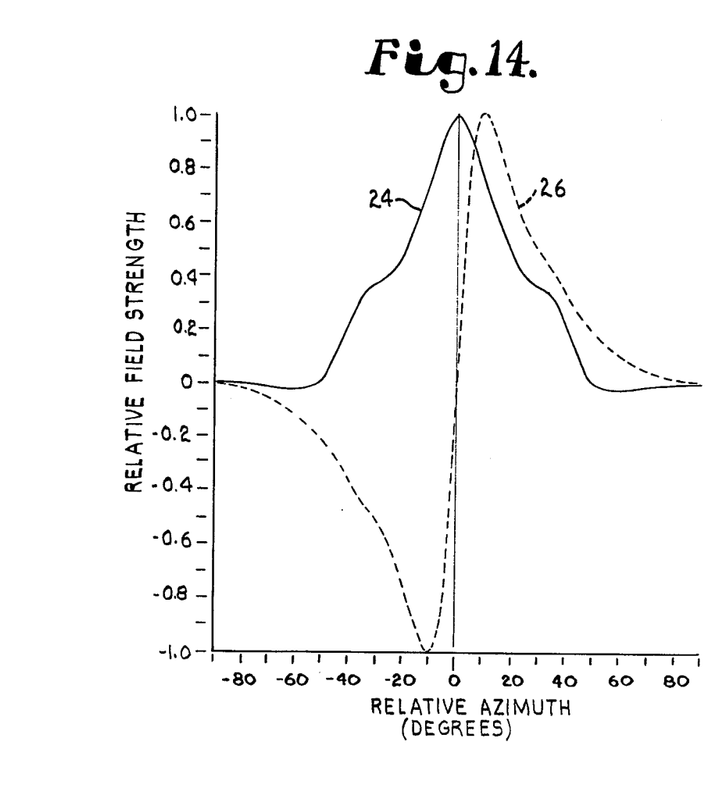
FIG. 14 is a graph of the radiation patterns of the clearance-frequency signals.

The relative amplitudes and phases of the clearance-frequency portion of array, which comprises only the center six elements of the antenna structure, is shown in Table II. As may be noted, only a portion of the total aperture of the overall structure is utilized. The center-to-center distance between the outermost clearance elements 3L—3R is only slightly greater than 32 feet (386-5/16 inches). Thus, as would be expected, the clearance-frequency portion of the array produces the rather broad CSB radiation pattern shown at 24 in FIG. 14. The half-power beamwidth of this pattern is approximately ±10°, but a substantial level of radiation is maintained out to ±35°. The clearance-frequency SBO radiation pattern 26 is correspondingly broad. Therefore, the clearance-frequency portion of the array provides localizer guidance signals outside the region that is served by the total course-frequency array, to at least ±35°.

Table II

| Ant. No. | Relative CSB Signal Ampl. | Phase | Relative SBO Signal Ampl. | Phase |
|---|---|---|---|---|
| 3L | 0.200 | 0° | 0.139 | −90° |
| 2L | 0 | 0° | 0.333 | −90° |
| 1L | 1.000 | 0° | 1.000 | −90° |
| 1R | 1.000 | 0° | 1.000 | +90° |
| 2R | 0 | 0° | 0.333 | +90° |
| 2R | 0 | 0° | 0.333 | +90° |
| 3R | 0.200 | 0° | 0.139 | +90° |

The Stripline Hybrid Couplers

The proper distributions of both the course-frequency and the clearance-frequency carrier-plus-sideband (CSB) and sideband-only (SBO) signals among the fourteen radiating elements of the localizer antenna array are achieved by means of a distribution system comprising stripline-type transmission line networks which may be interconnected with short lengths of coaxial cable. Each of these stripline distribution networks consists of a single layer of continuous, interconnected stripline circuitry which is completely embedded in a teflon-fiberglass dielectric medium approximately 0.066 inch thick that is retained between two aluminum plates approximately 0.160 inch thick each. An appropriate number of female coaxial connectors, mounted on one face of each stripline package, provides a means for making input and output connections as well as other necessary interconnections. The use of two stripline packages is preferred, one for course-frequency distribution and the other for clearance-frequency distribution. By way of illustration, the smaller of the two stripline packages (clearance-frequency) is approximately 12 inches (30 cm.) square by 3.0 inches (7.6 cm.) thick, and the larger, course-frequency stripline package is approximately twice as large. With the exception of the center pins of the coaxial connectors, the design of these rugged stripline packages is of a nature to provide almost completely trouble-free operation for an indefinite period of time.

The general arrangement of the overall distribution system for the 14-element capture-effect localizer antenna array is shown in the block diagram of FIG. 1. Seven combiner-divider hybrids designated by the numerals 1 through 7 deliver power to the correspondingly designated pair of antenna elements 1L—1R through 7L—7R. Each of these hybrids is a four-port device to be discussed in detail hereinbelow; each device has two inputs which receive input power from corresponding outputs of a course-frequency CSB power divider network 28 and a course-frequency SBO power divider network 30. Clearance-frequency power is injected into these networks 28 and 30 as illustrated by the clearance-frequency CSB power divider network 32 and the clearance-frequency SBO power divider network 34. The circuitry for generating the course and clearance signals is conventional and well-known in the art; thus the input signals to the divider networks 28-34 are represented by the appropriately labeled input arrows in FIG. 1 associated with the divider network blocks. The overall function of these networks is, of course, to divide the input course-frequency CSB and SBO signals, and the input clearance-frequency CSB and SBO signals, in a manner to produce the signal distributions as to both amplitude and phase represented by Tables I and II, or such other power division as may be selected for a given system design depending upon the particular radiation patterns desired.

The appropriate distributions of course-frequency and/or clearance-frequency CSB and SBO signals is accomplished in the present invention by means of a number of 50-ohm miniature 3-db stripline backward-wave quadrature hybrid couplers and associated 50-ohm stripline interconnecting lines. Each of the combiner-divider hybrids 1 through 7 comprises one such coupler; the networks 28-34 also employ these couplers as basic building blocks. Thus, each distribution network 28-34, as well as the overall distribution system, is a completely "flat" 50-ohm transmission line network; no quarter-wave impedance transformers or other impedance discontinuities are used to achieve the distributions of either the course-frequency or clearance-frequency signals nor to accomplish the combination of course-frequency and clearance-frequency signals for the group of three element pairs of the array which radiate both.

Figure 10:
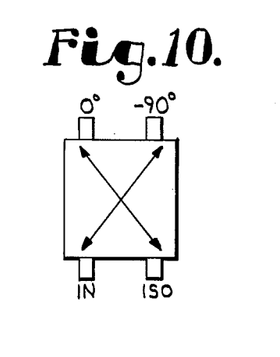
FIG. 10 is a schematic illustration of the physical configuration of a 3-db hybrid coupler employed in the networks of the present invention.
Figure 11:
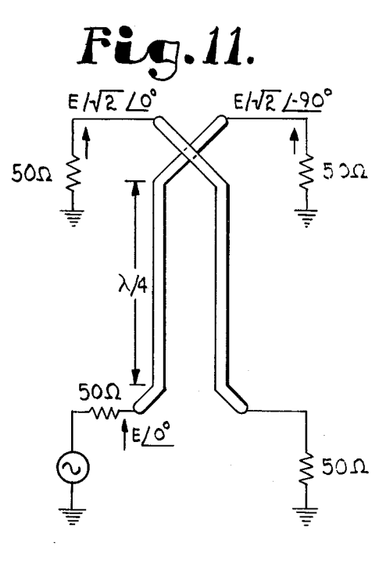
FIG. 11 is a schematic illustration of the coupler of FIG. 10, showing an equivalent electrical connection.

Each of the miniature 3-db hybrid couplers used in both the course-frequency and clearance-frequency distribution networks is a broadband, four-port, stripline device designed to operate over a frequency range of approximately 100 to 120 MHz. Schematic representations of this coupler are shown in FIGS. 10 and 11 (physical configuration and equivalent electrical connection respectively). As indicated, the miniature hybrid is a "broadside" stripline directional coupler which has an electrical length of approximately one-quarter wavelength at the midband (i.e., design-center) frequency.

The nature of this directional coupler is such that when a traveling wave (derived from a 50-ohm source) is incident upon the port designated IN, so as to produce a voltage $E\,\underline{/0°}$ across the terminals of this port, and all other ports of the device are terminated in 50-ohm loads, the incident power is divided equally between the "direct" and "coupled" output ports, designated −90° and 0°, respectively. Under these circumstances, the voltage that appears at the output port designated −90° is $E/\sqrt{2}\,\underline{/-90°}$ while the voltage that appears at the output port designated 0° is $E/\sqrt{2}\,\underline{/0°}$. No RF energy enters or leaves the port designated ISO. Consequently, this isolated port provides a second, independent means for transfer of RF energy to the two output ports. More specifically, if the 50-ohm load terminating the ISO port in FIG. 11 were to be replaced by a 50-ohm generator which produces a voltage $V\,\underline{/0°}$ across the terminals of this ISO port, then the total output at the −90° port would be $E/\sqrt{2}\,\underline{/-90°} + V/\sqrt{2}\,\underline{/0°}$, and the total output at the 0° port would be $E/\sqrt{2}\,\underline{/0°} + V/\sqrt{2}\,\underline{/-90°}$. Thus, in theory, the coupler is perfectly matched and has infinite directivity at all frequencies. In practice, a VSWR less than 1.1:1 and directivities in excess of 25 db can be maintained over the specified frequency band.

From the foregoing description of the miniature 3-db hybrid coupler, it is evident that this stripline device is only capable of dividing RF power incident upon an input port equally between two output ports. It is, however, possible to obtain unequal power division with such a stripline device by either changing the coupling per unit length between the two transmission lines of the directional coupler or by changing the length of the coupled line section. Changing the coupling per unit length requires a change in the spacing and/or dielectric constant between the two lines. Either of these actions would, therefore preclude the realization of a complete localizer distribution network in a single layer of continuous stripline circuitry. Changing the lengths of the coupled sections is undesirable because coupling is a sinusoidal function of frequency; consequently, a quarter-wave section of coupled lines provides the most stable configuration in terms of operating frequency and/or variations of stripline length that may result from temperature changes.

Figure 12:
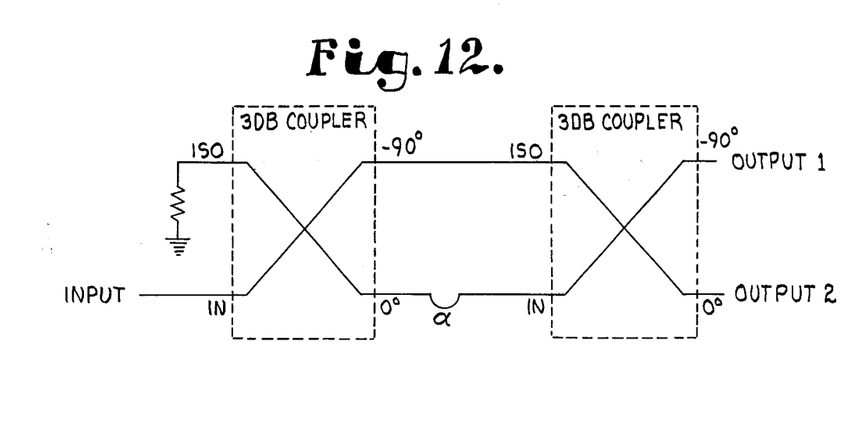
FIG. 12 is a schematic diagram of a hybrid power divider used to effect unequal power division in the networks of the present invention.

In order to avoid the use of either of these undesirable techniques, unequal power division is accomplished by using two 3-db hybrid stripline couplers in the arrangement shown in FIG. 12. The first coupler in this arrangement divides the RF input power incident upon its IN port equally between its two outputs (0° and −90°) in the manner discussed above. The output power which appears at the −90° port of this first coupler is applied directly to the ISO port of the second hybrid coupler. The output power appearing at the 0° output port of the first coupler is connected to the IN port of the second coupler through a 50-ohm delay line of length $\alpha$. The second 3-db coupler effects a recombination of these two input signals to produce signals of respective amplitudes $V_1 = V \cos(\alpha/2)$ at its −90° port (output 1 in FIG. 12) and $V_2 = V \sin(\alpha/2)$ at its 0° port (output 2 in FIG. 12). These two output signals are in phase with each other, and each lags the input to the first 3-db coupler at $\alpha/2 + 90°$.

The operation of each of the combiner-divider hybrids 1 through 7 in FIG. 1 may now be understood. As mentioned above, each such hybrid comprises one of the couplers of FIGS. 10 and 11; additionally, a 90° delay line in the feeder from the output port driving the left element completes the circuit configuration. The coupler receives a CSB signal at its IN port and an SBO signal at its ISO port. In accordance with the theory of operation just discussed, each of the two outputs delivers a composite CSB-SBO drive signal for the respective element of the localizer array. More specifically, if the input signal incident on the IN port of a given combiner-divider hybrid is a CSB signal represented by $V_C$ $/+90°$ while the input signal incident on the ISO port is an SBO signal represented by $V_s$ $/+90°$, then the output signal at the 0° port of this combiner-divider will be the composite CSB-SBO signal represented by $V_C/\sqrt{2}$ $/+90° + V_s/\sqrt{2}$ $/0°$ while the output signal at the −90° port will be the composite signal represented by $V_C/\sqrt{2}$ $/0° + V_s/\sqrt{2}$ $/+90°$. Insertion of the 90° (quarter wavelength) delay line at the 0° output port of the combiner-divider hybrid converts the output signal at this port to $V_C/\sqrt{2}$ $/0° + V_s/\sqrt{2}$ $/−90°$. This signal is now of the proper amplitude and phase for driving that element of a pair of symmetrically disposed radiating elements located on the 150-Hz side (left side) of the array center when the signal at the −90° output port of the combiner-divider hybrid is used to drive the corresponding element on the 90-Hz side (right side) of array center.

Distribution System in Detail

Figure 2:
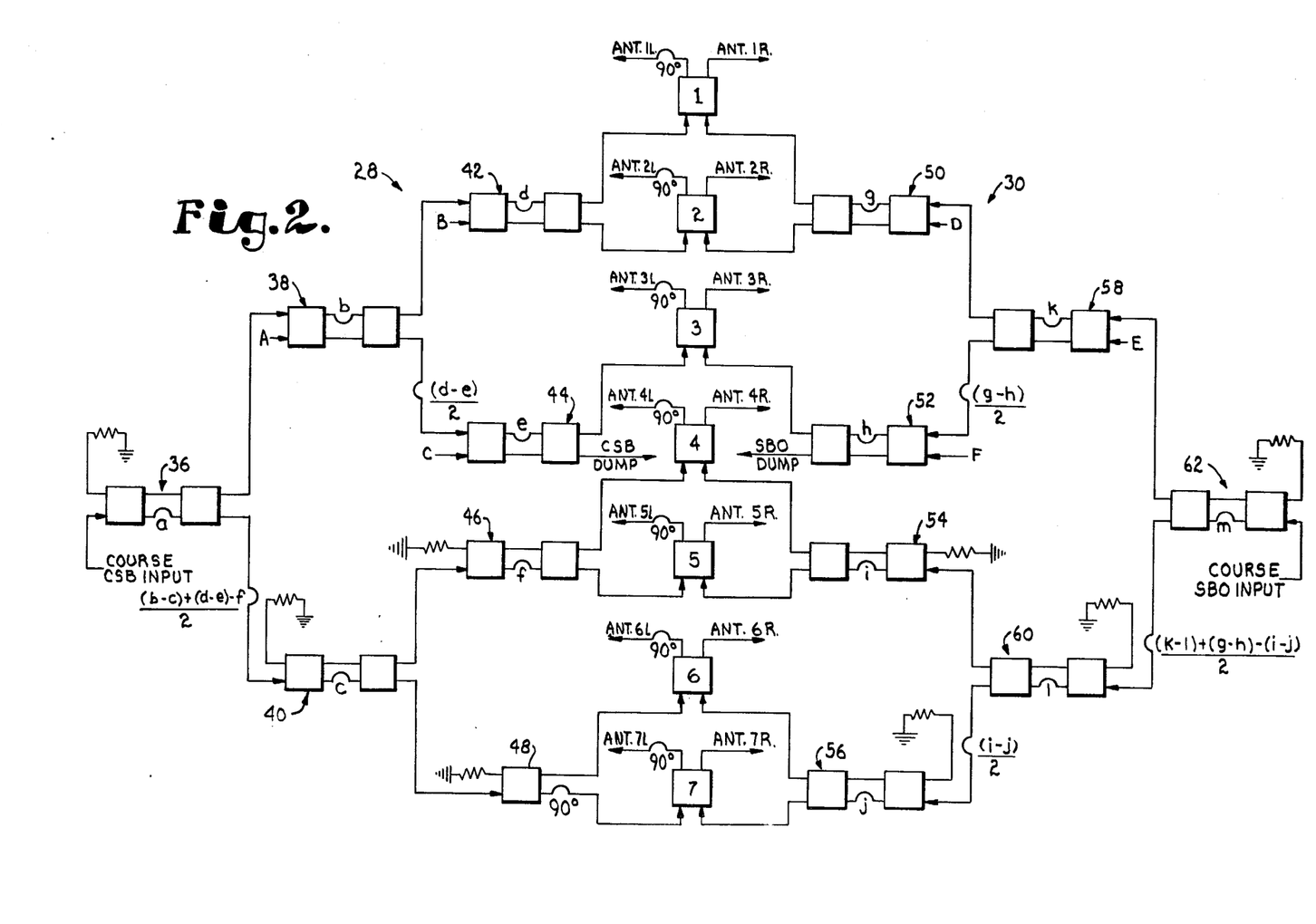
FIGS. 2 and 3 are electrical schematic diagrams of the distribution system of FIG. 1.

The course-frequency distribution circuit is illustrated schematically in FIG. 2 and includes the networks 28 and 30 and the combiner-divider hybrids 1–7 shown generally in FIG. 1. The course-frequency CSB input is divided into eight different signals of appropriately related amplitudes by a "tree" of seven hybrid power dividers designated 36, 38, 40, 42, 44, 46, and 48. Similarly, a second tree of seven hybrid power dividers, designated 50, 52, 54, 56, 58, 60 and 62, divides the course-frequency SBO input into eight different signals of appropriate relative amplitudes. Each of these hybrid power dividers comprises two 3-db stripline couplers, as described above and illustrated in FIGS. 10 and 11, connected back-to-back with a differential phase shift in one of the two interconnecting lines, as described above and illustrated in FIG. 12. (A singular exception is power divider 48, which is one 3-db coupler only.) Seven of the eight course-frequency CSB signals obtained in this manner are combined individually with seven of the eight course-frequency SBO signals, by means of the seven combiner-divider hybrids designated 1 through 7. As previously discussed, this results in a distribution of seven pairs of course-frequency composite CSB-SBO drive signals to the fourteen radiating elements of the localizer antenna array. The remaining two course-frequency signals, designated as CSB DUMP and SBO DUMP in FIG. 2, are not used by the antenna array; they may be considered (at least for purposes of the present discussion) to be terminated in 50-ohm dummy loads. These DUMP signals, however, represent only a small reduction in the radiation efficiency of the antenna array.

When the course-frequency distributions of CSB and SBO antenna element currents are known, the values of the course-frequency CSB DUMP signal ($V_{CD}$) and SBO DUMP signal ($V_{SD}$) that represent a tolerable reduction (for example, 1.25 db) in the overall course-frequency radiation efficiency of the localizer array can be found. Once these values are established, the design of the course-frequency distribution networks is accomplished in a straightforward manner.

The isolated ports of certain hybrid power dividers in the course-frequency distribution networks 28 and 30 shown in FIG. 2 provide convenient, independent means for driving the center six elements of the 14-element antenna array with clearance-frequency signals as well. More specifically, injection of clearance-frequency CSB signals at the isolated ports A, B and C of hybrid power dividers 38, 42 and 44, respectively, will produce clearance-frequency CSB signals at each of the center six antenna element output ports and the CSB DUMP output port. Similarly, injection of clearance-frequency SBO signals at the isolated ports D, E and F of hybrid power dividers 50, 58 and 52, respectively, will produce clearance-frequency SBO signals at each of the center six antenna element output ports and the SBO DUMP port. Using the known power division ratios of the hybrid power dividers 38, 42 and 44, it is possible to determine what the relative amplitudes of the clearance-frequency CSB signals injected at the isolated ports A, B and C must be in order to produce the desired distribution of clearance-frequency CSB signals on the center three pairs of elements of the array. Likewise, the relative amplitudes of the clearance-frequency SBO signals injected at the isolated ports D, E and F that are required to produce the desired distribution of clearance-frequency SBO signals on the center three pairs of elements can be determined by using the known power division ratios of the hybrid power dividers 50, 58 and 52.

Figure 3:
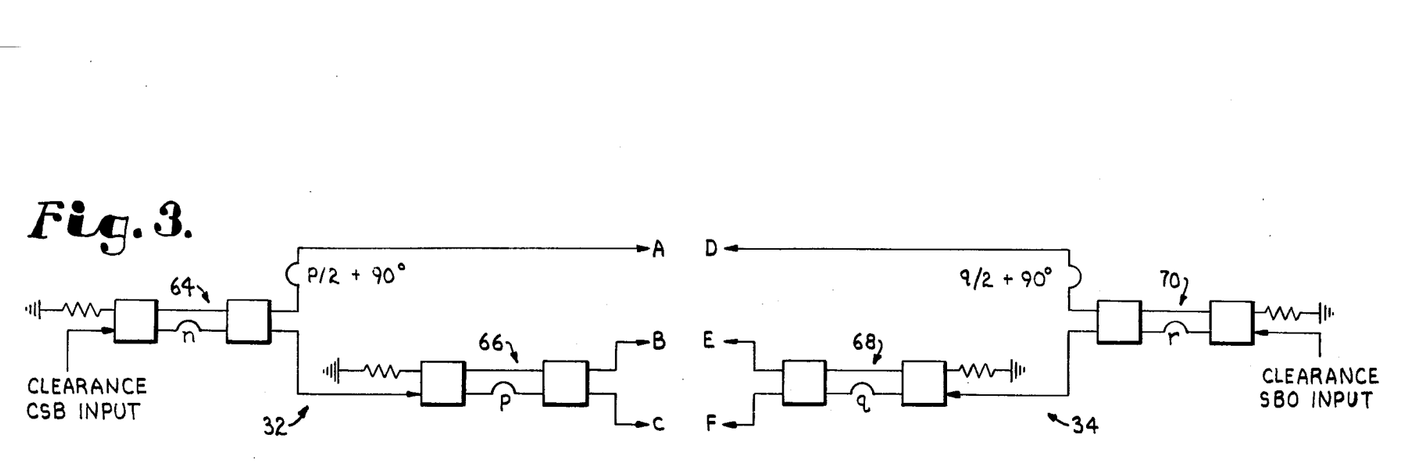

The injection is accomplished by a clearance-frequency distribution circuit illustrated in FIG. 3, which includes the networks 32 and 34 shown generally in FIG. 1. The network 32 includes hybrid power dividers 64 and 66 that divide the clearance-frequency CSB input signal into three parts of prescribed relative amplitudes which are delivered to respective ports A, B and C; likewise, network 34 has hybrid power dividers 68 and 70 which divide the clearance-frequency SBO input signal in proper manner to supply the isolated ports D, E and F. The power dividers 64–70 are of the same type utilized in the course-frequency divider networks and shown in detail in FIG. 12.

The design procedure for the various power distribution networks will now be outlined. It is assumed that the relative amplitudes of the course-frequency and clearance-frequency CSB and SBO signals that must be radiated by each of the 14 antenna elements (i.e., the relative amplitudes of the element currents) have been established, such as by an array synthesis procedure.

The first step in the design of an RF power distribution network which will supply both the course-frequency and clearance-frequency antenna currents that are required is to determine the relative amplitudes of the course-frequency CSB and SBO DUMP signals (i.e., $V_{CD}$ and $V_{SD}$) that represent a tolerable reduction of 1.25 db in the overall course-frequency radiation efficiency of the array. This is accomplished by the relatively simple arithmetic process of solving the equations $$10 \log x/\sqrt{(x + V_{CD}^2)} = -1.25$$

and $$10 \log y/\sqrt{(y + V_{SD}^2)} = -1.25$$

where $x$ represents the sum of the squares of the course-frequency CSB relative element current amplitudes and $y$ represents the sum of the squares of the course-frequency SBO relative element current amplitudes.

Referring to FIG. 2, once the values of $V_{CD}$ and $V_{SD}$ have been determined, the design of the hybrid power dividers 42, 44 and 46 and 50, 52, 54 and 56 is easily accomplished. For example, power divider 42 is required to furnish two output signals which stand in the ratio $V_{C1}/V_{C2}$. (C1 through C7 and S1 through S7 designate the inputs to correspondingly numbered combiner-divider hybrids 1–7.) Therefore, the differential phase shift incorporated into this power divider must be $$d = 2 \tan^{-1}(V_{C1}/V_{C2}).$$

By a similar process it is established that the differential phase shifts incorporated in power dividers 44, 46 and 50-56 are, respectively, $e = 2 \tan^{-1}(V_{C3}/V_{CD})$
$f = 2 \tan^{-1}(V_{C5}/V_{C4})$
$g = 2 \tan^{-1}(V_{S1}/V_{S2})$
$h = 2 \tan^{-1}(V_{S3}/V_{SD})$
$i = 2 \tan^{-1}(V_{S5}/V_{S4})$
$j = 2 \tan^{-1}(V_{S7}/V_{S6}).$ (The letters $a$ through $m$ refer to the values of $\alpha$ in the respective hydrid power dividers bearing such letter designations in FIG. 2.) According to Table I, $V_{C6} = V_{C7}$; consequently, the power divider 48 is one 3-db stripline directional coupler with a 90° phase-equalizing delay line in one output.

Next, the hybrid power dividers 38, 40, 58 and 60 are designed by taking into account the fact that their outputs furnish the input signals for power dividers 42 through 56. For example, neglecting losses, the input signal for power divider 42 must be proportional to $\sqrt{V_{C1}^2 + V_{C2}^2}$ while the input signal for divider 44 must be proportional to $\sqrt{V_{C3}^2 + V_{CD}^2}$. It follows that divider 38 is required to furnish two output signals which stand in the ratio $\sqrt{V_{C1}^2 + V_{C2}^2}/\sqrt{V_{C3}^2 + V_{CD}^2}$. Therefore, the differential phase shift incorporated into 38 must be $b = 2 \tan^{-1}(\sqrt{V_{C1}^2 + V_{C2}^2}/\sqrt{V_{C3}^2 + V_{CD}^2})$.

Similarly, it is found that the differential phase shifts incorporated into power dividers 40, 58 and 60 are, respectively, $$c = 2 \tan^{-1}(\sqrt{V_{C7}^2 + V_{C6}^2}/\sqrt{V_{C5}^2 + V_{C4}^2})$$

$$k = 2 \tan^{-1}(\sqrt{V_{S1}^2 + V_{S2}^2}/\sqrt{V_{S3}^2 + V_{SD}^2})$$

and $$l = 2 \tan^{-1}(\sqrt{V_{S7}^2 + V_{S6}^2}/\sqrt{V_{S5}^2 + V_{S4}^2}).$$

Finally, the design of the hybrid power dividers 36 and 62 is approached in a similar manner to find the differential phase shifts $$a = 2 \tan^{-1}(\sqrt{V_{C7}^2 + V_{C6}^2 + V_{C5}^2 + V_{C4}^2}/\sqrt{V_{C1}^2 + V_{C2}^2 + V_{C3}^2 + V_{CD}^2})$$

and $$m = 2 \tan^{-1}(\sqrt{V_{S7}^2 + V_{S6}^2 + V_{S5}^2 + V_{S4}^2}/\sqrt{V_{S1}^2 + V_{S2}^2 + V_{S3}^2 + V_{SD}^2}).$$

Equalization of signal phases is now necessary. For example, the phase delays through the hybrid power dividers 42 and 44 are, respectively, $(90° + d/2)$ and $(90° + e/2)$. Therefore, if the phases of the output signals of these two power dividers are to be equal, the phase of the input to divider 44 must be delayed by $(d - e)/2$. The results of the complete equalization of phases are indicated by the delay lines and accompanying legends in FIG. 2. The circuit shown schematically in FIG. 2 will provide course-frequency CSB and SBO antenna element currents in the proper distributions of relative phase and amplitude to the fourteen elements of the antenna array. In addition, it will provide course-frequency CSB and SBO DUMP signals (not used by the antenna) that result in an effective reduction of the course-frequency radiation efficiency of only 1.25 db.

Design of the clearance-frequency distribution circuit shown in FIG. 3 begins with a determination of the relative clearance-frequency signal levels that must be injected into the isolated ports A, B, C, D, E and F of the course-frequency distribution circuit of FIG. 2, in order to obtain the desired distribution of clearance-frequency CSB and SBO relative element current amplitudes on the center six elements of the 14-element array. The signals $E_A$, $E_B$ and $E_C$ which must be injected to produce relative CSB element current amplitudes $E_{C1}$, $E_{C2}$ and $E_{C3}$ are found by solving the three equations $E_A \cos (b/2) \sin (d/2) + E_b \cos (d/2) = E_{C1}$
$E_A \cos (d/2) \cos (d/2) - E_B \sin (d/2) = E_{C2}$ and
$-E_A \sin (b/2) \sin (e/2) + E_C \cos (e/2) = E_{C3}$ The signals $E_D$, $E_E$ and $E_F$ which must be injected to produce relative SBO element current amplitudes $E_{S1}$, $E_{S2}$ and $E_{S3}$ are found by solving the three equations $E_E \cos (k/2) \sin (g/2) + E_D \cos (g/2) = E_{S1}$ $E_F \cos (k/2) \cos (g/2) - E_D \sin (g/2) = E_{S2}$ and $-E_E \sin (k/2) \sin (h/2) + E_F \cos (h/2) = E_{S3}$ When the values of $E_A$, $E_B$, $E_C$, $E_D$, $E_E$ and $E_F$ have been found, the design of the two three-way power division networks shown in FIG. 3 is completed by means of the same procedure outlined above for the course-frequency distribution circuit. The letters $n, p, q$ and $r$ in FIG. 3 designate the values of the $\alpha$ phase delays for the respective power dividers 64, 66, 68 and 70, and the values of the delay lines feeding the outputs to the isolated ports A and D are indicated by the associated legends.

Course-Injected Distribution System

Figure 4:
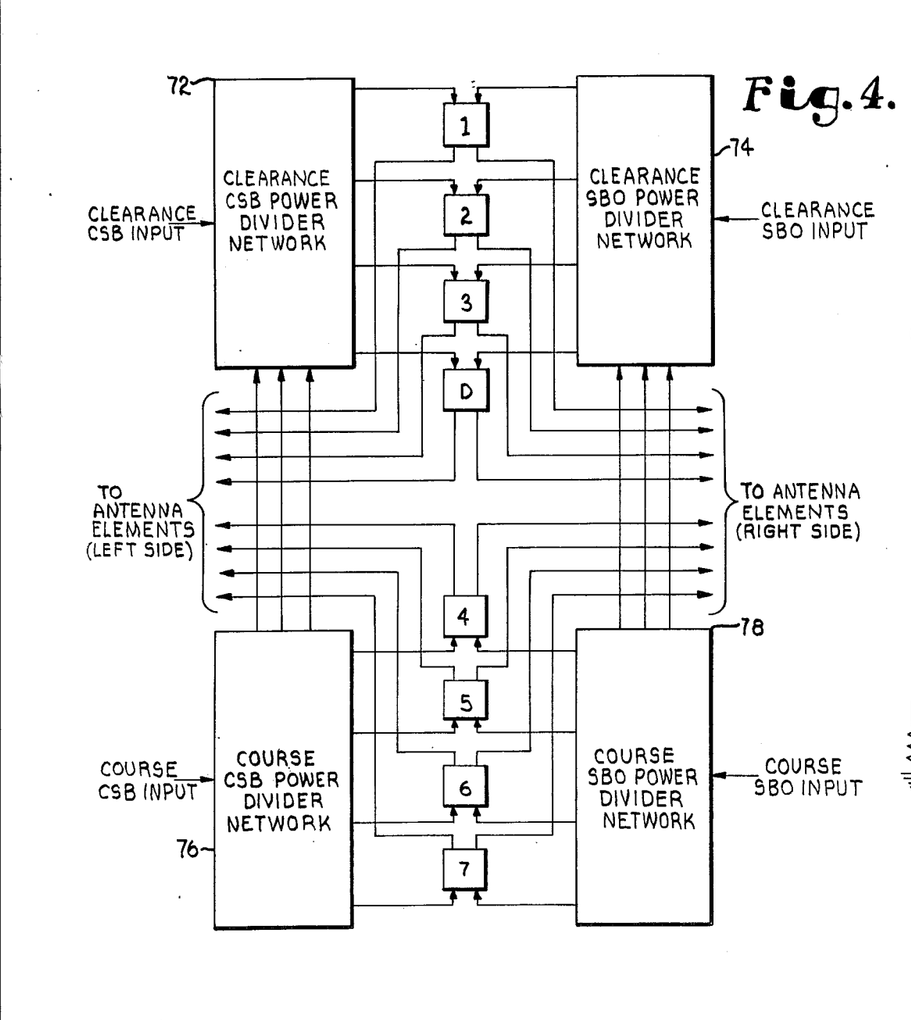
FIG. 4 is a block diagram of an alternative form of RF distribution system.
Figure 5:
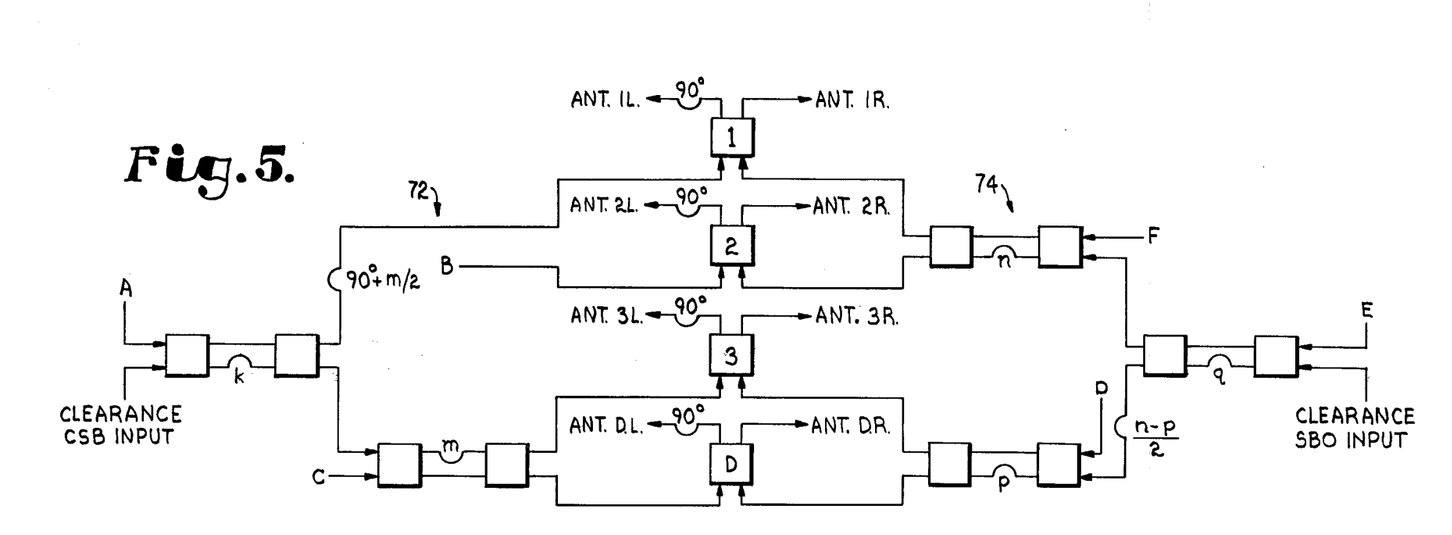
FIGS. 5 and 6 are electrical schematic diagrams of the alternative system of FIG. 4.
Figure 6:
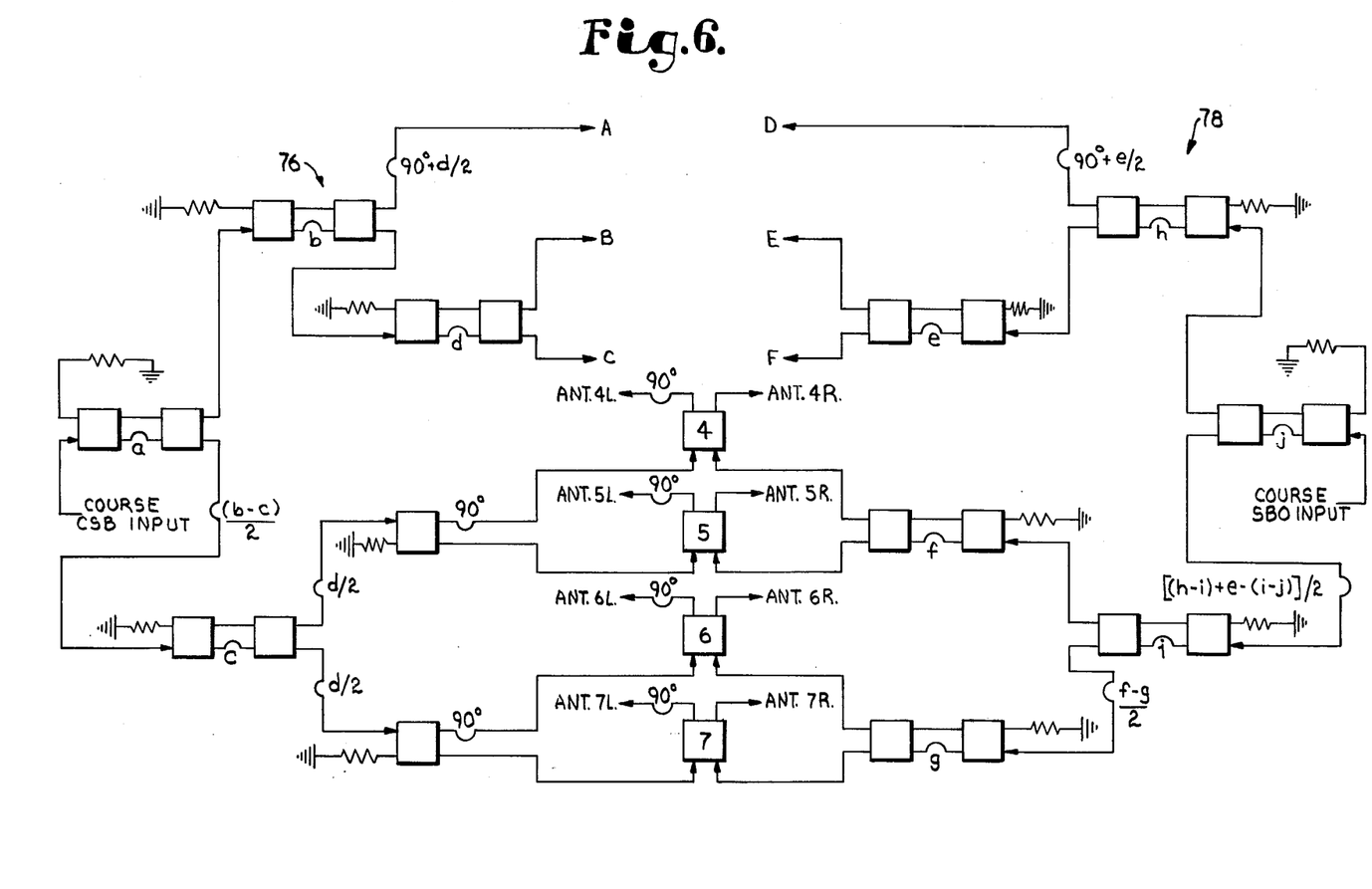

An alternative form of the RF distribution system of the present invention is illustrated in FIGS. 4–6. Comparing the block diagram of FIG. 4 with the block diagram of FIG. 1, it may be seen that the alternative system is functionally identical to the system described in detail above with reference to FIGS. 1–3. Separate course and clearance CSB and SBO input signals are combined and divided in order to feed the 14-element array of the present invention. One distinction from the standpoint of circuitry that is readily apparent is the use of an additional combiner-divider hybrid D in addition to the hybrids designated 1–7 that feed the seven element pairs. Combiner-divider hybrid D feeds a dummy element pair as will be explained.

Specifically, the distribution circuit of FIG. 4 includes a clearance-frequency CSB power divider network 72 and a clearance-frequency SBO power divider network 74, each having four outputs feeding corresponding inputs of combiner-divider hybrids 1, 2, 3 and D. A course-frequency CSB power divider network 76 and a course-frequency SBO power divider network 78 likewise have outputs feeding corresponding inputs of combiner-divider hybrids 4, 5, 6 and 7. Additionally, the course networks 76 and 78 inject course-frequency signals into the clearance networks 72 and 74 so that both course-frequency and clearance-frequency signals are delivered to the three center element pairs 1L—1R, 2L—2R and 3L—3R, plus the dummy antenna.

The clearance-frequency distribution circuit is illustrated schematically in FIG. 5 and includes the networks 72 and 74 and the combiner-divider hybrids 1, 2, 3 and D shown generally in FIG. 4. The clearance frequency CSB input is divided into four different signals of appropriately related amplitudes by two hybrid power dividers of the same type as discussed above with reference to FIGS. 1–3 and 12. The phase delay $\alpha$ in each is designated by the letters $k$ and $m$ respectively. Similarly, the clearance frequency SBO input is divided into four different signals of appropriately related amplitudes by a tree of three hybrid power dividers having $\alpha$ phase delays $n$, $p$ and $q$ respectively. Course-frequency power is injected at the isolated ports of these hybrids designated A, C, D, E and F, plus the IN input port B of combiner-divider hybrid 2.

Injection is accomplished by the course-frequency distribution circuit illustrated in detail in FIG. 6, which includes the networks 76 and 78 and the combiner-divider hybrids 4–7 shown generally in FIG. 4. It may be seen that CSB divider network 76 comprises a tree of four hybrid power dividers of the type shown in FIG. 12 (having $\alpha$ phase delays $a$, $b$, $c$ and $d$) and two 3-db hybrid couplers. The SBO divider network 78 comprises a tree of six hybrid power dividers having $\alpha$ phase delays $e$, $f$, $g$, $h$, $i$ and $j$. As shown in FIG. 6, outputs from these two networks 76 and 78 provide course power of appropriate relative amplitudes for the injection ports A–F and the inputs of the combiner-divider hybrids 4–7.

The result obtained with the circuitry of FIGS. 5 and 6 is equivalent to that obtained with the previously described circuitry of FIGS. 2 and 3, and the design procedure for the power distribution networks is the same. The legends in FIGS. 5 and 6 associated with the various delay lines interconnecting the power dividers express the degrees of phase delay for complete equalization of the output signal phases in terms of the $\alpha$ phase delays of the power dividers of the circuitry. It is understood, of course, that the values of $a$ through $j$, $k$, $m$, $n$, $p$ and $q$ bear no correspondence to the phase delays of like designation appearing in the previously described circuitry of FIGS. 2 and 3.

The Integral Monitor

Figure 7:
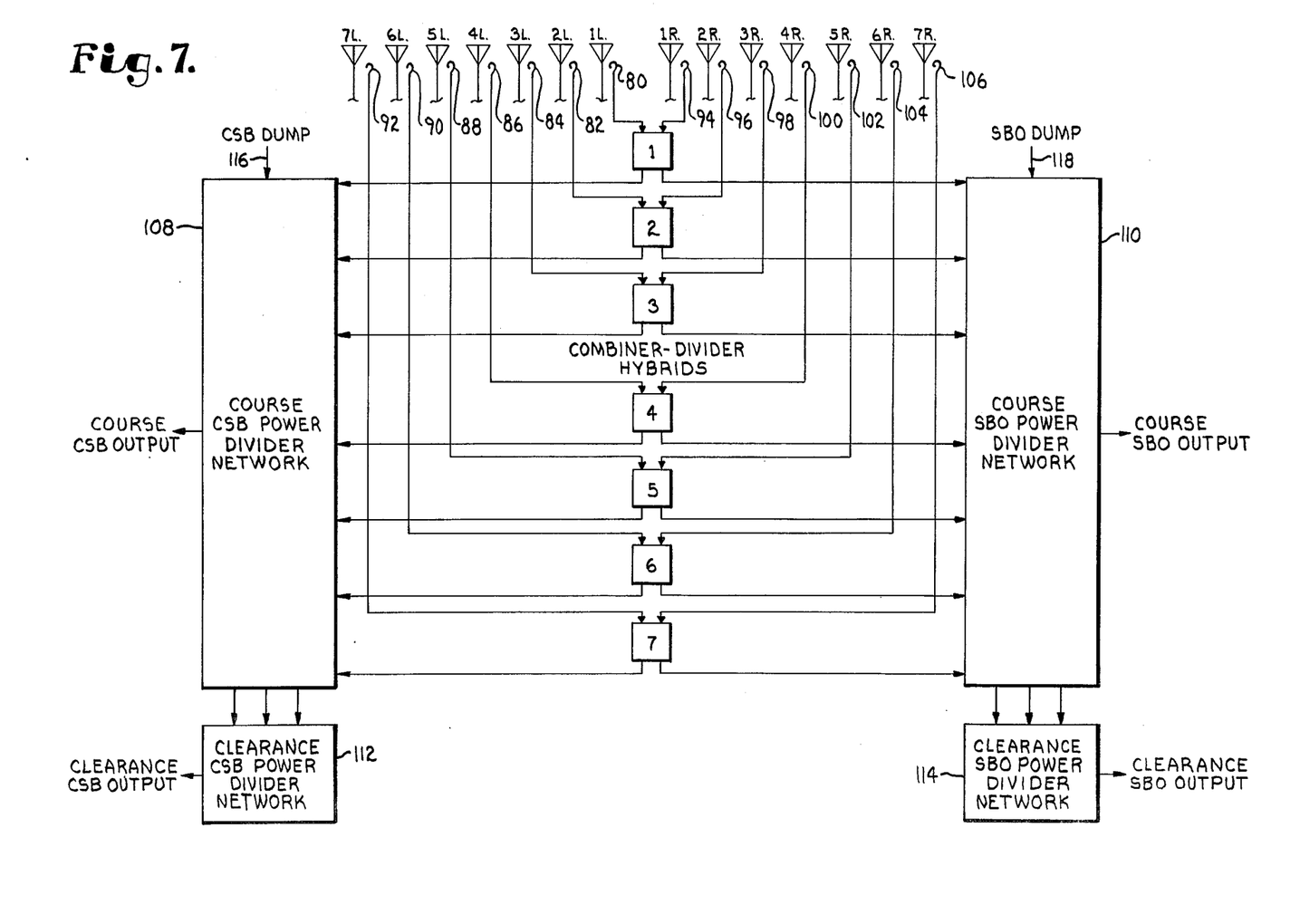
FIG. 7 is a block diagram of the monitor combining system of the present invention, and schematically illustrates the RF probes associated with the elements of the antenna array.
Figure 8:
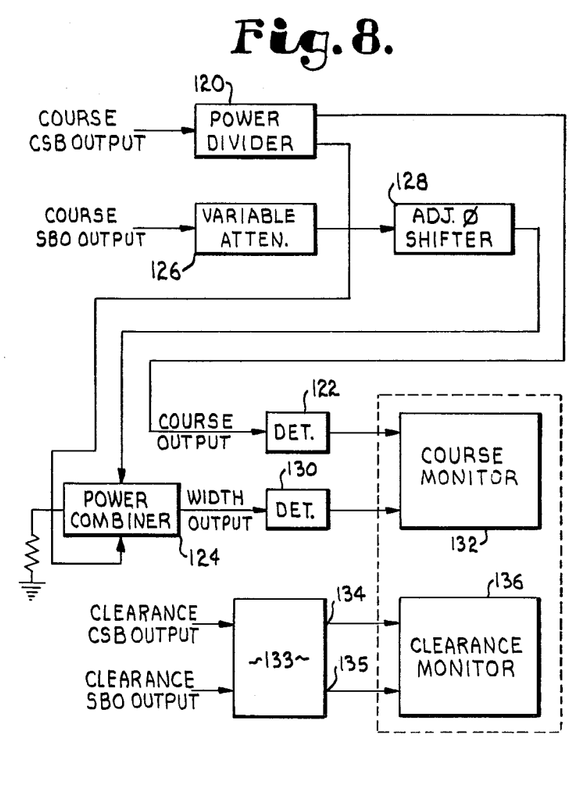
FIG. 8 is a block diagram of the processing circuitry associated with the monitor output.

The integral monitoring system of the present invention is illustrated in FIGS. 7 and 8. This system makes it possible to separately monitor the course-frequency and clearance-frequency performance of the antenna array solely in response to information provided by samples of the RF signals that are being radiated by the individual elements of the array. The RF signal samples are combined in a manner to simulate the character of the radiated RF field at two points in space, one of which is located on the course centerline (runway centerline) and the other of which is located at some selected azimuth relative to the course centerline (usually a half-course-width line).

Fourteen RF signal probes are illustrated schematically in FIG. 7 and are designated by the reference numerals 80, 82, 84, 86, 88, 90 and 92 (corresponding to antenna elements 1L–7L) and 94, 96, 98, 100, 102, 104 and 106 (corresponding to the antenna elements 1R–7R). Each of the probes is built into the associated antenna element, and may comprise a pickup lead placed in close proximity to the transmission line that feeds the active components of the element. Viewing FIG. 7, it may be seen that the block diagram is identical to the block diagram of FIG. 1 except for the substitution of the probes 80–106 for the antenna elements and the reversal of the direction of flow of the RF energy as indicated by the arrows. Accordingly, the monitoring system has seven combiner-divider hybrids numbered 1 through 7, a course-frequency CSB power divider network 108, a course-frequency SBO power divider network 110, a clearance-frequency CSB power divider network 112, and a clearance-frequency SBO power divider network 114. This circuitry combines the RF signal samples provided by the probes 80–106, and separates the combined signals into four components, as indicated by the course-frequency CSB and SBO outputs and the clearance-frequency CSB and SBO outputs from the networks 108–114.

In order to accomplish the recombining and separation of the signal samples from the probes necessary to provide the four outputs that are samples of the four original input components, the monitor networks 108–114 employ circuitry identical to the corresponding networks 28–34 of FIGS. 1–3. The 3-db hybrid coupler illustrated in FIGS. 10 and 11 are described in detail hereinabove, and the hybrid power divider for effecting unequal power division illustrated in FIG. 12 and also previously discussed in detail, are completely bilateral devices. Referring to FIG. 10, the power division represented by the signals appearing at the 0° and the −90° output ports, in response to an input signal applied to the IN port, is identically the same as that which would occur if the same input signal were applied at the 0° output port. In this latter case, the input signal is equally divided and appears at the IN and ISO ports with a lagging quadrature phase shift at the ISO port.

By way of illustration, it is assumed in FIG. 10 that an input signal E $\underline{/0°}$ is applied to the IN port, and that a second input signal of a different frequency V $\underline{/0°}$ is applied to the ISO port. The output at the 0° port is E/$\sqrt{2}$ $\underline{/0°}$ + V/$\sqrt{2}$ $\underline{/-90°}$; likewise, the output at the −90° port is E/$\sqrt{2}$ $\underline{/-90°}$ + V/$\sqrt{2}$ $\underline{/0°}$. If these same output signals are reapplied to the 0° and −90° ports of another 3-db coupler, remembering the bilateral nature of the device, the resultant signals then delivered at the IN and ISO ports are V $\underline{/-90°}$ and E $\underline{/-90°}$. Accordingly, the signals are recombined and separated into their basic components; the only difference is that they are retrieved from opposite ports and have shifted −90° in phase. However, their relative amplitude and phase are unchanged. This same result is produced if the two composite signals are applied to the IN and ISO ports, as the device is completely bilateral, in that V $\underline{/-90°}$ and E $\underline{/-90°}$ will be retrieved from the 0° and the −90° ports.

In view of the foregoing, the circuitry of FIGS. 2 and 3 is capable of operating "backwards," with the antenna feeders being replaced by the probes and the inputs now representing outputs. Since the 3-db coupler is bilateral, the hybrid power divider of FIG. 12 is likewise bilateral as it is simply two such couplers in tandem with a phase delay $\alpha$ in one interconnecting leg. Accordingly, the RF power distribution system shown in detail in FIGS. 2 and 3 is duplicated to provide the monitoring system shown in block diagram form in FIG. 7. Since the two systems are identical and completely bilateral, the signal samples appearing at the four outputs of the monitoring system of FIG. 7 are identical to the four input signals applied to the distribution system of FIGS. 1–3, except for the fact that the amplitudes of the sample signals will be relatively small and there will be an inherent phase delay, but the relative amplitudes of the reconstituted sample signals and their relative phases will be the same as those of the four input signals delivered to the distribution circuits of the transmitter. Since the recombining and separating of the sample signals in the monitor is accomplished by the addition and subtraction processes characteristic of the 3-db hybrid couplers, it is of no consequence that the frequency difference between the course and clearance carriers may be on the order of 5 KHz separation at a frequency of approximately 110 MHz.

It should be noted that in order to effect this backward operation in an actual two-frequency, capture-effect localizer antenna system, it is necessary to attenuate and phase shift the two DUMP signal outputs from the power dividers 44 and 52 in the distribution circuit of FIG. 2, in the same way that the RF signals on the antenna elements are effectively attenuated and phase shifted by the monitor probes, before connecting the CSB DUMP and SBO DUMP outputs of the distribution circuit to the CSB DUMP and SBO DUMP inputs 116 and 118 of the monitor combining system of FIG. 7. Two dummy antennas may be used for this purpose, as illustrated with respect to the alternative form of the RF distribution system shown in FIGS. 4–6 (in FIG. 5 note the combiner-divider hybrid D feeding the dummy antenna elements DL and DR). Thus, the hybrid power dividers of the monitor combining circuit corresponding to the power dividers 44 and 52 of the distribution circuit (FIG. 2) receive signal samples at their inputs related in amplitude and phase the same as the CSB DUMP and SBO DUMP output signals and the output signals delivered to the inputs of the combiner-divider hybrid 3 by the power dividers 44 and 52.

The samples of the four RF components of the navigation system provided at the four outputs of the monitor combining system of FIG. 7 may be processed in a conventional manner in order to obtain signals indicative of course position and course width. Referring to FIG. 8, the course-frequency CSB output from the monitor is split into two equal parts by a power divider 120, the signal derived from one output thereof (course output) being fed directly to a detector 122. The other output of power divider 120 is connected to one input of a power combiner 124.

The course-frequency SBO output from the monitor is fed to a variable attenuator 126 whose output is shifted in phase by an adjustable phase shifter 128 and delivered to a second input of the power combiner 124, where the signal is combined with the CSB signal to provide a width output signal that is delivered to a detector 130. The attenuator 126 and the phase shifter 128 are adjusted so that the width signal is a proper simulation of the radiated course-frequency field that exists in space at the half-course-width point. The outputs from both detectors 122 and 130 are fed to a monitor display 132 which indicates the difference in the depth of modulation (ddm) of the detected 90-Hz and 150-Hz signals from each of the two detectors. Assuming proper system operation, the ddm of the signal from the output of detector 122 should be zero (the course centerline), whereas the ddm of the signal from detector 130 at the simulated course edges would typically be 0.155.

The clearance-frequency output signals from the monitor combining circuitry are processed in like manner as illustrated by the block 133 in FIG. 8. The two detector outputs 134 and 135 are individually fed to a clearance monitor display 136 which indicates the ddm of each, thereby providing information indicative of the radiated clearance-frequency field.

Besides the ability to separate signals of small frequency separation in a two-frequency capture-effect system, the integral monitor of the present invention also provides redundant monitoring capability for antenna fault detection. Since, ideally, no RF signals will appear across the 50-ohm terminations at the unused, isolated ports of the hybrid power dividers of the networks (consider FIGS. 2 and 3 operating "backwards" as the monitor combining circuit) provided that the input monitor signals from the probes 80–106 are properly balanced in amplitude and phase, any unbalance in these monitor input signals that may arise as a result of a fault condition (i.e., open circuit or short circuit) in any one of the antenna elements will cause an RF signal level to appear at certain of these isolated ports. The particular ports affected will depend upon which of the antenna elements is defective.

Figure 9:
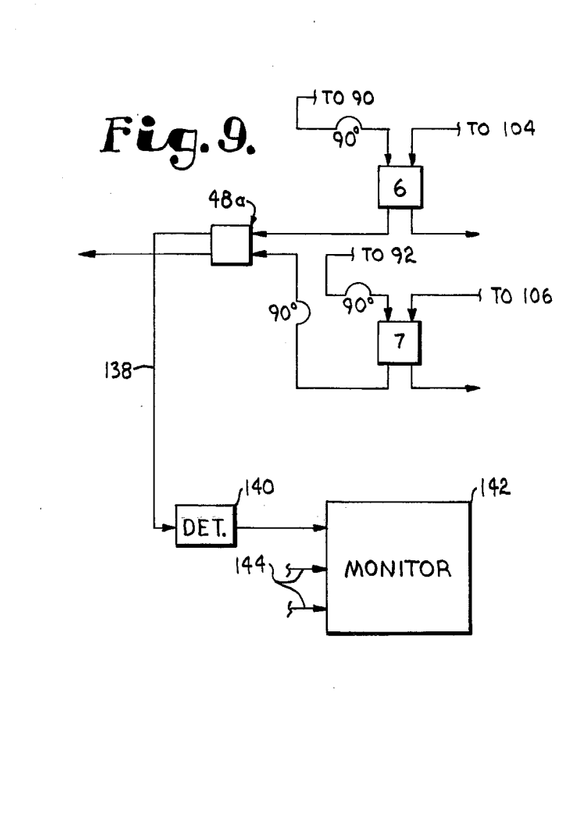
FIG. 9 is a fragmentary, electrical schematic diagram illustrating the redundant monitoring capability for antenna fault detection.

FIG. 9 illustrates redundant monitoring of antenna element pairs 6L—6R and 7L—7R, with which RF probes 90, 104, 92 and 106 are associated. FIG. 9 shows a portion of the monitor combining circuit employing combiner-divider hybrids 6 and 7 and hybrid coupler 48a, the latter having the 50-ohm termination at its previously terminated port replaced by a line 138 extending to a detector 140 whose output, along with the outputs 144 of detectors (not shown) associated with other selected power dividers of the monitor combining circuit, is fed to a suitable monitoring device 142. The function of the device 142 is to filter the rectified output from the detector 140 to obtain a DC level, and compare this level with a preset threshold level which, if exceeded, is representative of a fault condition. In like manner, other ports shown as 50-ohm terminations may be monitored in order to cover the entire array in preselected, separately monitored groups of antenna elements.

Having thus described the invention, what is claimed as new and desired to be secured by Letters Patent is:

1. In a two-frequency capture-effect instrument landing system, the combination comprising:
   means for generating a course signal of a first frequency having a carrier component that includes sidebands and a separate component that includes sidebands only;
   means for generating a clearance signal of a second frequency having a carrier component that includes sidebands and a separate component that includes sidebands only;
   a single antenna array having a number of pairs of radiating elements symmetrically disposed on opposite sides of a navigational centerline, a portion of said number of pairs constituting a group of element pairs adapted to radiate both course-frequency and clearance-frequency power;
   carrier power distribution apparatus receiving said carrier components of said course and clearance signals and having a number of outputs corresponding to said pairs of elements,
   said carrier power distribution apparatus including means for effecting unequal power division of the received carrier components and delivering combined course and clearance power at desired relative amplitudes from the outputs thereof corresponding to said group of element pairs and exclusively course power at desired relative amplitudes from the remainder of its outputs;
   sideband power distribution apparatus receiving said sidebands only components of said course and clearance signals and having a number of outputs corresponding to said pairs of elements,
   said sideband power distribution apparatus including means for effecting unequal power division of the received sidebands only components and delivering combined course and clearance power at desired relative amplitudes from the outputs thereof corresponding to said group of element pairs and exclusively course power from the remainder of its outputs; and
   a number of combiner-divider devices, each associated with a corresponding element pair and having a pair of inputs connected with corresponding outputs of said carrier power distribution apparatus and said sideband power distribution apparatus respectively, and a pair of outputs connected with respective elements of the corresponding element pair for feeding the same,
   each of said devices being operable to combine the carrier and sidebands only components delivered to its inputs and divide the resultant composite signal equally between the two elements of the pair.

2. The combination as claimed in claim 1, wherein said carrier power distribution apparatus includes a first network of power dividers responsive to one of said carrier components, and a second network of power dividers responsive to the other of said carrier components for injecting the same into said first network to cause the outputs of said carrier power distribution apparatus corresponding to said group of element pairs to deliver said combined course and clearance power.

3. The combination as claimed in claim 2, wherein said sideband power distribution apparatus includes a third network of power dividers responsive to one of said sidebands only components, and a fourth network of power dividers responsive to the other of said sidebands only components for injecting the same into said third network to cause the outputs of said sideband power distribution apparatus corresponding to said group of element pairs to deliver said combined course and clearance power.

4. In an instrument landing system, the combination comprising:
   means for generating a navigation signal having a carrier component that includes sidebands and a separate component that includes sidebands only;
   an antenna array having a number of pairs of radiating elements symmetrically disposed on opposite sides of a navigational centerline;
   a power distribution unit having a first input receiving said carrier component, a second input receiving said sidebands only component, a number of pairs of outputs connected with corresponding pairs of elements, and power divider circuitry coupled between said inputs and said output pairs for effecting unequal power division of the received components and delivering carrier and sideband power at desired relative amplitudes and phases from said output pairs;
   radio frequency signal probes each associated with a respective element of said array for providing a sample of the radio frequency signal being radiated by that element;
   a monitor signal combining unit having a number of pairs of inputs corresponding to said pairs of elements, each input being connected with a respective probe for receiving the signal therefrom, first and second outputs, and power divider circuitry coupled between said input pairs and said first and second outputs for recombining said signal samples and delivering a sample of said carrier component at said first output and a sample of said sidebands only component at said second output, the power divider circuitry of each of said units having identical networks of power divider devices therein, each of said devices being characterized in that input power applied thereto is divided in accordance with a predetermined amplitude ratio and in that input power components applied thereto having said ratio are recombined by the device, corresponding devices in said distribution unit and said combining unit having the same characteristics of power division and recombination; and
   indicating means connected to said first and second outputs of the combining unit for monitoring predetermined characteristics of said sample components indicative of proper system operation.

5. The combination as claimed in claim 4, wherein each of said devices is a hybrid having input and output ports, certain of said devices in said combining unit having unused ports at which ideally no radio frequency signal appears unless a fault condition exists in the antenna array, and wherein is provided means connected with selected unused ports for detecting the presence of a radio frequency signal indicative of said fault condition.

6. In a two-frequency capture-effect instrument landing system, the combination comprising:

means for generating a course signal of a first frequency having a carrier component that includes sidebands and a separate component that includes sidebands only;

means for generating a clearance signal of a second frequency having a carrier component that includes sidebands and a separate component that includes sidebands only;

a single antenna array having a number of pairs of radiating elements symmetrically disposed on opposite sides of a navigational centerline, a portion of said number of pairs constituting a group of element pairs adapted to radiate both course-frequency and clearance-frequency power;

a power distribution unit having inputs receiving said carrier and said sidebands only components of said course and clearance signals, a number of pairs of outputs connected with corresponding pairs of elements and circuitry coupled between said inputs and said output pairs for effecting power division of the received components and for delivering combined course and clearance power at desired relative amplitudes from the output pairs thereof corresponding to said group of element pairs and exclusively course power at desired relative amplitudes from the remainder of its output pairs;

radio frequency signal probes each associated with a respective element of said array for providing a sample of the radio frequency signal being radiated by that element, the signal sample from each element of said group of element pairs containing both course-frequency and clearance-frequency power and the signal sample from each of the remaining elements of the array containing course-frequency power only; a monitor signal combining unit having a number of pairs of inputs corresponding to said number of pairs of elements, each input being connected with a respective probe for receiving the signal sample therefrom, four output connections, and circuitry coupled between said input pairs and said four output connections for recombining said signal samples and delivering a sample of said carrier component of the course signal at a first of said four output connections, a sample of said sidebands only component of the course signal at a second of said output connections, a sample of said carrier component of the clearance signal at a third of said output connections, and a sample of said sidebands only component of the clearance signal at the fourth of said output connections; and indicating means connected to said four output connections of the combining unit for monitoring predetermined characteristics of said sample components indicative of proper system operation.

7. The combination as claimed in claim 6, wherein said circuitry of each of said units has identical networks of bilateral power divider devices therein, said inputs of the distribution unit corresponding to said output connections of the combining unit, and said output pairs of the distribution unit corresponding to said input pairs of the combining unit.

8. The combination as claimed in claim 6, wherein said circuitry of each of said units has identical networks of power divider devices therein, each of said devices being characterized in that input power applied thereto is divided in accordance with a predetermined amplitude ratio and in that input power components applied thereto having said ratio are recombined by the device, corresponding devices in said distribution unit and said combining unit having the same characteristics of power division and recombination.

9. The combination as claimed in claim 8, wherein each of said devices includes at least one 3-db hybrid coupler having a pair of input ports and a pair of quadrature output ports.

10. The combination as claimed in claim 9, wherein certain of said devices in said combining unit have unused ports at which ideally no radio frequency signal appears unless a fault condition exists in the antenna array, and wherein is provided means connected with selected unused ports for detecting the presence of a radio frequency signal indicative of said fault condition.

* * * * *

UNITED STATES PATENT OFFICE
CERTIFICATE OF CORRECTION

PATENT NO. : 4,032,920
DATED : June 28, 1977
INVENTOR(S) : EDWIN J. MARTIN, JR., et al.

It is certified that error appears in the above-identified patent and that said Letters Patent are hereby corrected as shown below:

Column 4, Table II, line 65, the data for 2R, second occurrence should be deleted.

Column 10, line 50, change "$E_b$" to --$E_B$--.

Claim 4, Column 16, line 47, add a paragraph between "output," and "the power".

Claim 6, Column 17, line 23, add a comma between "elements" and "and".

Claim 6, Column 17, line 39, add a paragraph between "power only;" and "a monitor signal".

Signed and Sealed this

Twenty-seventh Day of September 1977

[SEAL]

Attest:

RUTH C. MASON
*Attesting Officer*

LUTRELLE F. PARKER
*Acting Commissioner of Patents and Trademarks*